Oct. 9, 1928.
J. A. GLACKEN
1,686,745
SLED
Filed Dec. 9, 1926   2 Sheets-Sheet 1
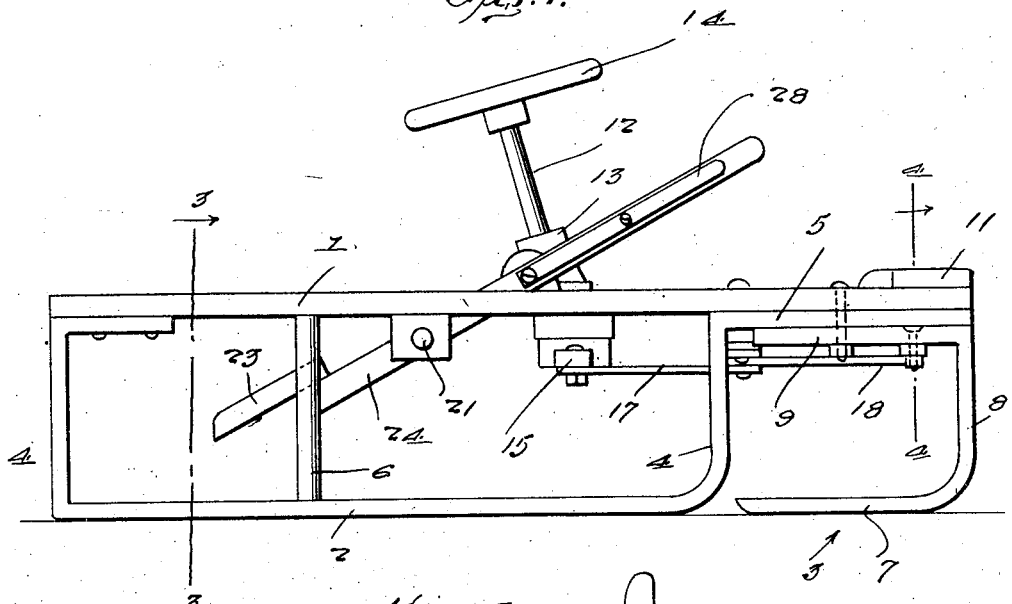
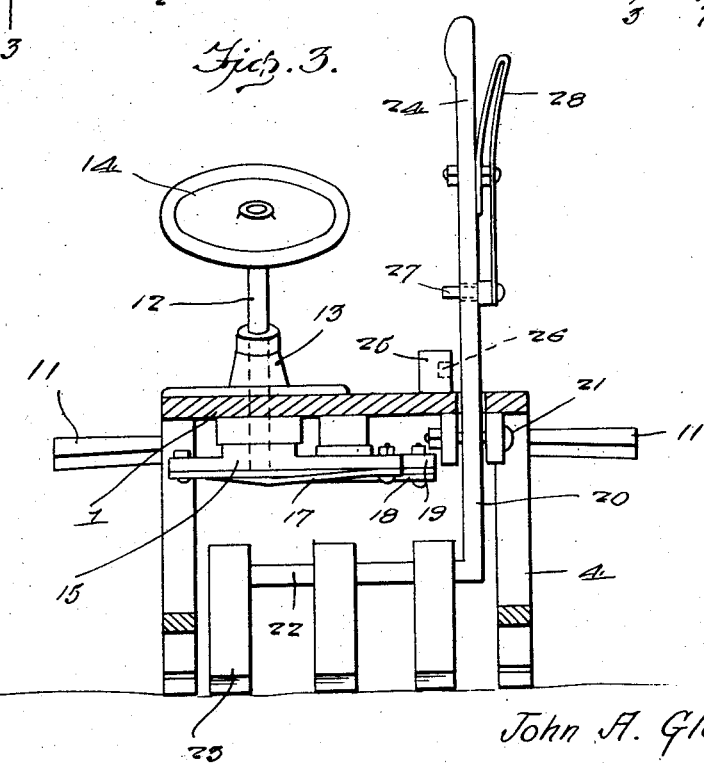
Inventor
John A. Glacken
By Clarence A. O'Brien
Attorney Oct. 9, 1928.  1,686,745
J. A. GLACKEN
SLED
Filed Dec. 9, 1926  2 Sheets-Sheet 2
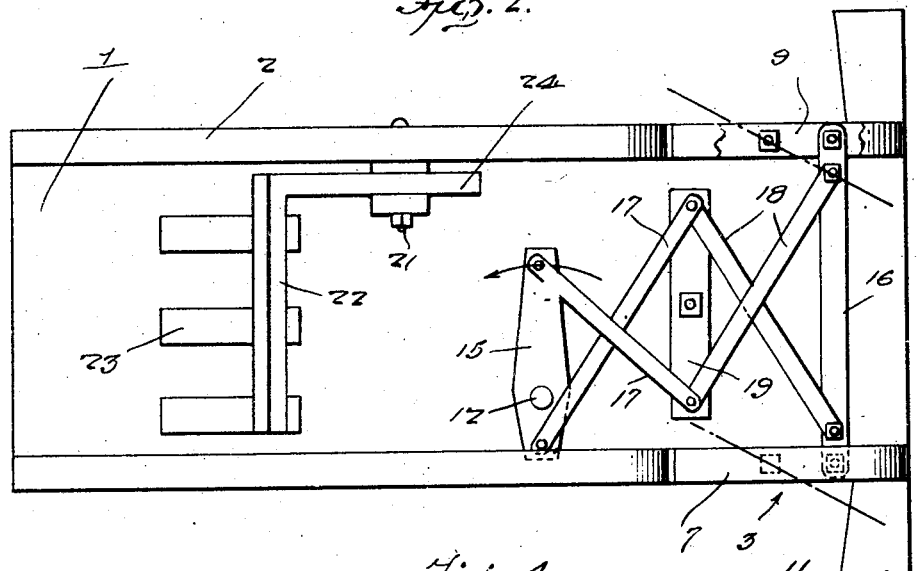
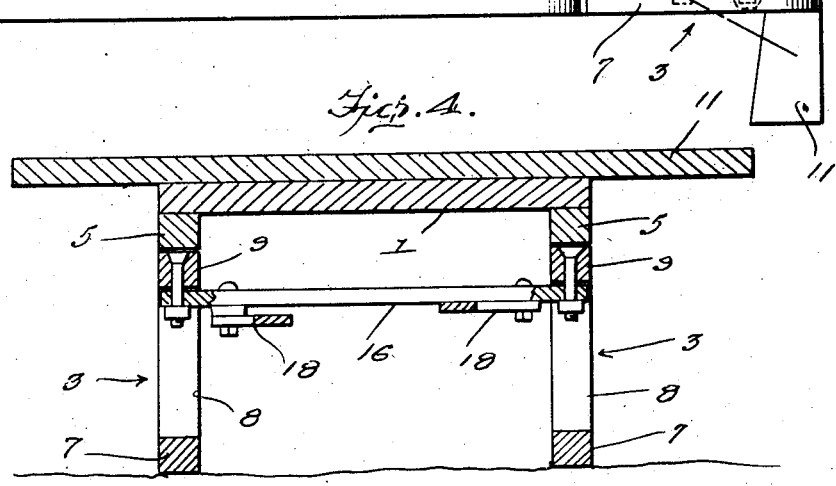
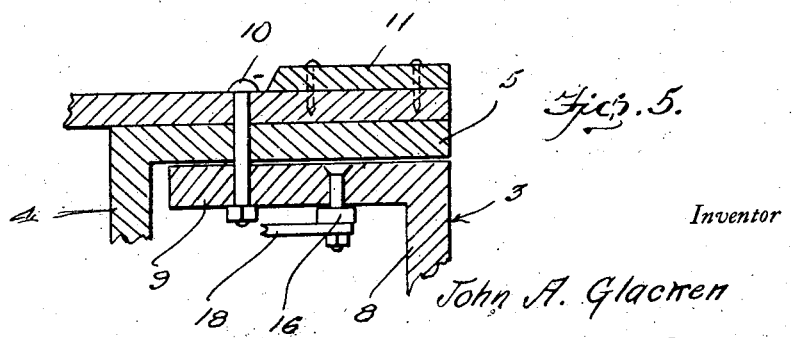
Inventor
John A. Glacken
By Clarence A. O'Brien
Attorney Patented Oct. 9, 1928.

1,686,745

UNITED STATES PATENT OFFICE.

JOHN ARTHUR GLACKEN, OF NORWICH, CONNECTICUT.

SLED.

Application filed December 9, 1926. Serial No. 153,584.

This invention relates to an improved sled construction and has reference, first to an improved runner structure; secondly, to improve steering mechanisms, and finally to a novel brake.

Briefly, the runner structure comprises a pair of side runners each of which includes a stationary rear section, and a pivotally mounted and relatively movable front section for permitting guiding of the sled.

The steering mechanism includes an inclined steering post having a hand wheel at its top and connected at its bottom to a novel linkage structure for imparting swinging movement to the movable front section of the runners for steering the latter.

The brake comprises a substantially L-shaped pivotally mounted member, a manually manipulated latch, and suitable brake shoes.

My principal aim is to generally improve upon structures of this general class by providing one including novel details arranged in what is believed to be a new association and manner for forming a characteristic and distinctive structure which is elaborate in appearance, yet comparatively simple in general construction.

Other objects and advantages of the invention will become apparent from the following description and drawings.

In the accompanying drawings forming a part of this application and in which like numerals are employed to designate like parts throughout the same:

Figure 1 is a side view of the complete sled.

Figure 2 is a bottom plan view of the same with a portion broken away.

Figure 3 is a transverse section on the line 3—3 of Figure 1.

Figure 4 is an enlarged transverse section on the line 4—4 of Figure 1 looking in a forward direction.

Figure 5 is an enlarged detail sectional view showing the runner mountings.

Referring to the drawings in detail it will be seen that the reference character 1 designates seat or top board which may be of any appropriate construction. As before stated, there are pairs of side runners connected to the longitudinal edge portion of this board and each runner, considered as a unit, is made up of a rear section 2 and a front section 3. The rear section comprises a suitably formed strip of metal having its opposite end portion directed upwardly as at 4, and its extremity directed angularly as at 5, and riveted or otherwise rigidly fastened to the under face of the seat board adjacent the opposite ends. If desired, a suitable bracing strut 6 may be arranged between the intermediate portion of this runner section, and the seat board as shown in Figure 1.

The front section which is the steerable or movable section is of general U-shaped formation, and embodies a bottom portion 7 forming the slides, a vertical portion 8 and rearwardly directed portion 9 which is connected by a pivot pin 10 to the adjacent end portion 5 of the complemental runner section and the seat board as represented plainly in Figure 5. In this connection I would direct attention to a cross piece 11 which is rigidly fastened to the top of the seat board and extends beyond the opposite longitudinal edges to form foot rests as represented better in Figures 2 and 3.

Considering now in detail the improved steering gear or mechanism, it will be seen that this comprises first a steering column 12 mounted in an appropriate bearing 13 and disposed at a substantially thirty degree angle, and inclined rearwardly. This is provided at its top with a hand wheel 14 to afford a convenient grip and to facilitate rotation. The lower end of this column is rigidly secured to a cross head 15 (see Figure 2) and it will be noted that the point of connection is between the center and one end, thus disposing the steering wheel on one side and near the center of the seat board. This permits the occupant to assume a convenient and comfortable position, while steering. As also shown in this figure, there is a cross piece or connecting strip 16 between the pivotally mounted front runner sections 2 which serves to move these sections simultaneously. Linkage is employed between the cross head 15 and the connecting strip 16. The linkage comprises two separate pairs, the links of one pair being represented by the reference character 17, and the links of the other pair being represented by the reference character 18. The adjacent ends of the respective pairs of links are connected with a pivotally mounted tie bar 19. Obviously with this arrangement upon rotation of the steering wheel, the cross head 15 will swing on an arc represented by an arrow in Figure 2 to impart movement to the linkage structure which will inturn transmit such movement to the connecting strip 16, thus swinging the front runner sections upon their pivots. It has been noted, of course, that in order to equalize the movement and strain, the links are of short and long dimensions respectively; that is each pair comprises a short link and a long link. This is essential because of the offset disposition of the steering wheel.

Attention is now directed to the brake which comprises, as before indicated, a substantially L-shaped lever 20 pivotally mounted at 21 upon suitable brackets and having a short arm disposed beneath the seat board and its long arm extending upwardly through an elongated slot formed in said seat board. Mounted in any suitable manner upon the short arm 22 are brake shoes 23 which may be of any appropriate configuration. I show a series of three of such shoes, but any number may be employed in practice. The upper end of the long arm 24 is constructed to provide a hand-grip. Mounted on the top side of the seat board is a block 25 having a socket in one side providing a keeper seat for reception of a retaining detent 27. This detent is carried by one arm of a bent operating spring member 28 carried by the upper portion of the lever.

It is believed that by carefully considering the detailed description in connection with the accompanying drawings, a clear understanding of the construction and operation of the invention will be had. Therefore, a more lengthy description is thought unnecessary.

While the preferred embodiment of the invention has been specifically shown and described, it is of course understood that any minor changes in shape, size, and relative arrangement of parts coming within the scope of the adjoined claims may be resorted to if desired.

Having thus described the invention, what I claim as new is:—

1. In a sled structure of the class described, a seat board, a pair of side runner units, each unit comprising a rear and front section, the rear section having its intermediate portion fashioned to form a slide for contact with the surface, having its opposite end portions directed upwardly and terminating in angular extremities rigidly fastened to the front and rear ends of the under side of said seat board, each front section being of general U-shaped formation and having its bight portion located at the forward end of the seat board, the upper arm or portion of each front section being in contact with the adjacent end portion of the complemental section, pivot bolts connecting said upper arms and said seat board, a connecting bar between the upper arms of the respective front sections, a rotatably mounted steering column, a hand wheel carried by the upper end of the column, and an operating connection between the lower end of the column and said connecting bar, whereby said front sections may be moved upon their pivots through the operation of said hand wheel.

2. In a sled structure of the class described, a seat board, side runner units connected to the longitudinal edge portions of the under side of said board, said units comprising a rigid rear section, and a swingably mounted front section, the front sections constituting steering means, a bearing connected to the top of the seat board adjacent the center and over toward one longitudinal edge portion, a rearwardly inclined steering column mounted for rotation in said bearing, a hand wheel carried by the upper end of said column, a cross head connected to the lower end of the column and disposed beneath said seat board, a connecting bar between said swingably mounted front runner sections, an operating linkage between said cross head and said connecting bar.

In testimony whereof I affix my signature.

JOHN ARTHUR GLACKEN.